United States Patent
Chae

(10) Patent No.: US 7,342,616 B2
(45) Date of Patent: Mar. 11, 2008

(54) LIQUID CRYSTAL DISPLAY AND FABRICATING METHOD THEREOF

(75) Inventor: Gee Sung Chae, Incheon-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 17 days.

(21) Appl. No.: 10/028,687

(22) Filed: Dec. 28, 2001

(65) Prior Publication Data

US 2002/0180897 A1 Dec. 5, 2002

(30) Foreign Application Priority Data

Jun. 5, 2001 (KR) .................. 10-2001-0031514

(51) Int. Cl.
*G02F 1/1343* (2006.01)
*G02F 1/13* (2006.01)

(52) U.S. Cl. .......................... 349/39; 349/43

(58) Field of Classification Search ............ 349/38–42
See application file for complete search history.

(56) References Cited

U.S. PATENT DOCUMENTS

| | | | |
|---|---|---|---|
| 4,773,741 A * | 9/1988 | Inaba et al. ................. | 359/266 |
| 5,227,103 A * | 7/1993 | Muschiatti ................. | 264/45.9 |
| 5,447,878 A * | 9/1995 | Park et al. ................... | 438/396 |
| 5,731,856 A * | 3/1998 | Kim et al. .................... | 349/43 |
| 5,748,266 A * | 5/1998 | Kodate ........................ | 349/39 |
| 5,834,328 A * | 11/1998 | Jang ............................ | 438/30 |
| 5,897,328 A * | 4/1999 | Yamauchi et al. ............ | 438/29 |
| 5,990,986 A * | 11/1999 | Song et al. ................... | 349/43 |
| 6,057,896 A * | 5/2000 | Rho et al. ..................... | 349/42 |
| 6,137,551 A * | 10/2000 | Jeong ........................... | 349/38 |
| 6,204,520 B1 * | 3/2001 | Ha et al. ...................... | 257/72 |
| 6,350,995 B1 * | 2/2002 | Sung et al. ................... | 257/59 |
| 6,424,399 B1 * | 7/2002 | Shimada et al. ............ | 349/147 |
| 2002/0012078 A1 * | 1/2002 | Jung et al. ..................... | 349/38 |
| 2002/0140876 A1 * | 10/2002 | Yoo et al. ..................... | 349/38 |
| 2002/0180900 A1 * | 12/2002 | Chae et al. .................. | 349/43 |

FOREIGN PATENT DOCUMENTS

| JP | 03-141325 | * 6/1991 |
|---|---|---|
| JP | 09-232580 | * 9/1997 |

* cited by examiner

Primary Examiner—Dung T. Nguyen
(74) Attorney, Agent, or Firm—Birch, Stewart, Kolasch & Birch, LLP

(57) ABSTRACT

A liquid crystal display increases the capacitance of a storage capacitor while increasing aperture ratio. The liquid crystal display includes a gate insulating film entirely covering a gate electrode, and an active layer on the gate insulating film overlaps the gate electrode. An ohmic contact layer is formed on the active layer, and source electrode and drain electrodes are on the ohmic contact layer such that a channel forms between them. A protective layer covers the source and the drain electrodes, and a data line crosses the gate line and connects to the source electrode by piercing the protective layer. A storage electrode is at a pixel cell area of the same layer as the gate electrode and the gate line, and a pixel electrode opposes the storage electrode having the gate insulating film in between them.

24 Claims, 19 Drawing Sheets

LIQUID CRYSTAL DISPLAY AND FABRICATING METHOD THEREOF

This nonprovisional application claims priority under 35 U.S.C. § 119(a) on Patent Application No. 2001-31514 filed in Korea on Jun. 5, 2001, which is herein incorporated by reference.

BACKGROUND OF THE INVENTION

1. Field of the Invention

This invention relates to a liquid crystal display and fabricating method thereof, and more particularly to a liquid crystal display that obtains the capacitance of a storage capacitor while increasing the aperture ratio.

2. Description of the Related Art

Generally, a liquid crystal display (LCD) controls the light transmittance of liquid crystal cells in response to a video signal to thereby display a picture. An active matrix LCD having a switching device for each liquid crystal cell is suitable for displaying a moving picture. The active matrix LCD mainly uses a thin film transistor (TFT) as the switching device.

The LCD uses a storage capacitor for the purpose of sustaining the voltage drop across the liquid crystal to assure the stability of a gray level display. The storage capacitor is classified into a storage on gate (SOG) system that overlaps a portion of the (n-1)th gate line with the nth pixel electrode to form a storage capacitor of the nth pixel, and a storage on common (SOC) system that provides a separate common electrode at the lower portion of a pixel electrode to form a storage capacitor.

FIG. 1 is a plan view showing a structure of an array substrate of a conventional LCD adopting a storage on gate system, and FIG. 2 is a section view of the array substrate taking along the A-A' line in FIG. 1.

Referring to FIG. 1 and FIG. 2, a lower substrate 11 of the LCD includes a TFT arranged at an intersection between a gate line 15' and a data line 17. A pixel electrode 33 is connected to a drain electrode 27 of the TFT, and a storage capacitor is positioned at an overlapping portion between the pixel electrode 33 and the pre-stage gate line 15.

The TFT includes a gate electrode 13 connected to the gate line 15', a source electrode 25 connected to the data line 17, and a drain electrode 27 connected, via a first contact hole 30a, to the pixel electrode 33. Further, the TFT includes a gate insulating film 19 for insulating the gate electrode 13 and the source and drain electrodes 25 and 27, and semiconductor layers 21 and 23 for defining a conduction channel between the source electrode 25 and the drain electrode 27 by a gate voltage applied to the gate electrode 13. Such a TFT responds to a gate signal from the gate line 15' to selectively apply a data signal from the data line 17 to the pixel electrode 33.

The pixel electrode 33 is positioned at a cell area divided by the data line 17, and the gate line 15' and is made from a transparent conductive material having a high light transmittance. The pixel electrode 33 is provided on a protective film 31 coated on the entire surface of the lower substrate 11 and is electrically connected, via the first contact hole 30a defined in the protective film 31, to the drain electrode 27. The pixel electrode 33 generates a potential difference from a common transparent electrode (not shown) provided at an upper substrate (not shown) by a data signal applied via the TFT. This potential difference allows a liquid crystal positioned between the lower substrate 11 and the upper substrate (not shown) to change the liquid crystalline molecular arrangement in accordance with its dielectric anisotropy. Accordingly, an arrangement of the liquid crystal molecules is changed for each pixel in accordance with a data voltage applied via the TFT, thereby expressing pictorial information on the LCD.

The storage capacitor should have a capacitance value large enough to maintain a stable pixel voltage. To this end, the storage capacitor includes a capacitor electrode 29 electrically connected, via a second contact hole 30b, to the pixel electrode, and a gate line 15 having a gate insulating film 19 therebetween.

FIG. 3A to FIG. 3E are section views for explaining a method of fabricating the array substrate of the LCD shown in FIG. 2.

Referring first to FIG. 3A, the gate electrode 13 and the gate line 15 are provided on the substrate 11. The gate electrode 13 and the gate line 15 are formed by depositing aluminum (Al) copper (Cu) or other suitable materials by using a deposition technique such as sputtering, and then patterning it.

Referring to FIG. 3B, the gate insulating film 19, an active layer 21 and an ohmic contact layer 23 are provided. The gate insulating film 19 is formed by depositing an insulating material such as silicon nitride ($SiN_x$) or silicon oxide ($SiO_x$) using a plasma enhanced chemical vapor deposition (PECVD) technique in such a manner as to cover the gate electrode 13 and the gate line 15.

The active layer 21 and the ohmic contact layer 23 are formed by sequentially disposing two semiconductor layers on the gate insulating film 19 and then patterning the disposed semiconductor layers. The active layer 21 is formed from amorphous silicon that is not doped with an impurity. On the other hand, the ohmic contact layer 23 is formed from amorphous silicon doped with an n-type or p-type impurity at a high concentration.

Referring to FIG. 3C, the data line 17, the source and drain electrodes 25 and 27 and the capacitor electrode 29 are provided on the gate insulating film 19. The data line 17, the source and drain electrodes 25 and 27 and the capacitor electrode 29 are formed by entirely depositing a metal layer using a CVD technique or a sputtering technique and then patterning. After the source and drain electrodes 25 and 27 were patterned, the ohmic contact layer 23 at an area corresponding to the gate electrode 13 is patterned to expose the active layer 21. The area of the active layer 21 corresponding to the gate electrode 13 between the source and drain electrodes 25 and 27 makes a channel. The capacitor electrode 29 overlaps with the gate line 15. The data line 17, the source and drain electrodes 25 and 27 and the capacitor electrode 29 are made from chromium (Cr) or molybdenum (Mo).

Referring to FIG. 3D, a protective layer 31 having first and second contact holes 30a and 30b is provided. The protective layer 31 is formed by depositing an insulating material on the gate insulating layer 19 and then patterning it in such a manner to cover the source and drain electrodes 25 and 27. The protective layer 31 is mainly made from an inorganic insulating material such as silicon nitride ($SiN_x$) or silicon oxide ($SiO_x$).

Referring to FIG. 3E, a pixel electrode 33 is provided on the protective film 31. The pixel electrode 33 is formed by depositing a transparent conductive material on the protective film 31 and then patterning it. The pixel electrode 33 is electrically connected, via the first contact hole 30a, to the drain electrode 27 and is electrically connected, via the second contact hole 30b, to the capacitor electrode 29. The pixel electrode 33 is made from a transparent conductive material that can be indium-tin-oxide (ITO), indium-zinc-oxide (IZO) or indium-tin-zinc-oxide (ITZO).

FIG. 4 is a plan view showing a structure of an array substrate of a conventional LCD having storage on a common system. FIG. 5 is a sectional view of the array substrate taking along the B-B' line in FIG. 4.

In this storage on common system, a storage capacitor is positioned at the center of a pixel area. The storage capacitor should have a capacitance value large enough to maintain a stable pixel voltage. To this end, the storage capacitor has a pixel electrode 55 electrically connected to a drain electrode 59, and a capacitor common electrode 45 having a gate insulating film 49 therebetween.

FIG. 6A to FIG. 6D are section views for explaining the method steps of fabricating the array substrate of the LCD shown in FIG. 5.

Referring to FIG. 6A, the gate electrode 43, the capacitor electrode 45 and the gate line 47 are provided on the substrate 41. The gate electrode 43, the capacitor electrode 45 and the gate line 47 are formed by depositing aluminum (Al), copper (Cu) or other suitable material by using a deposition technique, preferably sputtering, and then patterning.

Referring to FIG. 6B, the gate insulating film 49, an active layer 51 and an ohmic contact layer 53 are provided. The gate insulating film 49 is formed by depositing an insulating material such as silicon nitride ($SiN_x$) or silicon oxide ($SiO_x$) using a plasma enhanced chemical vapor deposition (PECVD) technique so as to cover the gate electrode 43, the capacitor common electrode 45 and the gate line 47.

The active layer 51 and the ohmic contact layer 53 are formed by sequentially disposing two semiconductor layers on the gate insulating film 49 and then patterning the disposed semiconductor layers. The active layer 51 is formed from undoped amorphous silicon. On the other hand, the ohmic contact layer 53 is formed from amorphous silicon doped with a high concentration of an N-type or P-type impurity.

Referring to FIG. 6C, a pixel electrode 551 the data line 63 and source and drain electrodes 57 and 59 are provided on the gate insulating film 49. The pixel electrode 55 is formed by depositing a transparent conductive material on the gate insulating film 49 and then patterning it. The pixel electrode 55 is made from any one of ITO, IZO and ITZO.

Subsequently, the data line 63 (see FIG. 4) and the source and drain electrodes 57 and 59 are provided. The data line 63 and the source and drain electrodes 57 and 59 are formed by entirely depositing a metal layer using a CVD technique or a sputtering technique and then patterning. After the source and drain electrodes 57 and 59 were patterned, the ohmic contact layer 53 at an area corresponding to the gate electrode 43 is patterned to expose the active layer 51. The area of the active layer 51 corresponding to the gate electrode 43 between the source and drain electrodes 57 and 59 makes a channel. The drain electrode 59 electrically contacts the pixel electrode 55 without any contact hole. The data line 63 and the source and drain electrodes 57 and 59 are made from chromium (Cr) or molybdenum (Mo).

Referring to FIG. 6D, a protective film 61 is provided at a TFT area. The protective film 61 forms by depositing an insulating material on the gate insulating layer 19 and then patterning it in such a manner to cover the source and drain electrodes 57 and 59. The protective film 61 is mainly made from an inorganic insulating material such as silicon nitride ($SiN_x$) or silicon oxide ($SiO_x$).

Such a liquid crystal display has an increased capacitance value of the storage capacitor so as to overcome the flicker phenomenon. Increasing the capacitance value of the storage capacitor requires increasing the area of the capacitor electrode. In other words, the LCD of storage on gate system should widen the width of the gate line so as to increase the capacitance value of the storage capacitor. However, since the aperture ratio is reduced and a line delay effect of a gate signal is enhanced when a width of the gate line is widened, there is a limit to widening the width of the gate line. Furthermore, since the LCD of storage on common system has the storage capacitor provided at the center of the pixel cell, this LCD has a smaller aperture ratio than a LCD of a storage on gate system.

As discussed above, as the area of the capacitor electrode increases, the aperture ratio is reduced. In particular, a high pixel density LCD, a ferroelectric LCD or a semi-ferroelectric LCD acquires high capacitance value of the storage capacitor while greatly reducing the aperture ratio. However, modern display technology requires enhanced capacitance while simultaneously maintaining or increasing the aperture ratio.

SUMMARY OF THE INVENTION

Accordingly, it is an object of the present invention to provide a liquid crystal display and a fabricating method thereof that is capable of increasing the capacitance of a storage capacitor while increasing aperture ratio.

The invention, in part, pertains to a liquid crystal display that includes a gate electrode and a gate line to which a scanning signal is supplied, a gate insulating film entirely deposited on a substrate to cover the gate electrode, an active layer formed on the gate insulating film to overlap with the gate electrode, an ohmic contact layer formed on the active layer, a source electrode formed on the ohmic contact layer, a drain electrode formed on the ohmic contact layer and opposed to the source electrode so as to have a channel in between them. A protective layer is formed on the entire surface of a substrate to cover the source and the drain electrodes, and a data line crosses with the gate line and connects to the source electrode in the manner of piercing the protective layer. A storage electrode is formed at a pixel cell area of the same layer as the gate electrode and the gate line, and a pixel electrode is formed to oppose to the storage electrode having the gate insulating film in between them and electrically connected with the drain electrode.

In a liquid crystal display of a preferred embodiment of the invention, a contact hole connects the source electrode with the data line. The liquid crystal display can further include a buffer metal layer on the source and the drain electrodes for reducing contact resistance. The buffer metal layer is formed of one of molybdenum (Mo), titanium (Ti) or tantalum (Ta). In the liquid crystal display, the storage electrode is formed of a transparent conductive material such as indium tin oxide (ITO). The liquid crystal display can further include a auxiliary storage electrode connected to each storage electrode.

The invention, in part, pertains to a method of fabricating a liquid crystal display that includes the steps of forming a gate electrode and a gate line on a substrate and at the same time forming a storage electrode on the same layer where the gate electrode and the gate line are formed, forming a gate insulating film to cover the gate electrode, the gate line and the storage electrode, forming an active layer on the gate insulating film to overlap with the gate electrode, forming an ohmic contact layer on the active layer, forming a source electrode and a drain electrode by patterning to expose the active layer, forming a protective layer on the source electrode and the drain electrode, forming a contact hole that pierces the protective layer, and forming a data line crossed with the gate line and connected with the source electrode through the contact hole.

The method according to a preferred embodiment of the invention further includes the step of forming a buffer metal layer on the source electrode and the drain electrode for reducing contact resistance. The buffer metal layer can be formed of one of molybdenum (Mo), titanium (Ti) or tantalum (Ta). In the method, the storage electrode is formed of a transparent conductive material such as indium tin oxide (ITO). In the method, an auxiliary storage electrode is formed to connect the storage electrode. The protective layer can be an organic insulating material of at least one material selected from the group consisting of acrylics, polytetrafluoroethylene, benzocyclobutene, perfluoropolymer resin and perfluorocyclobutane.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION

Advantages of the present invention will become more apparent from the detailed description given herein after. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 7 to FIG. 22 illustrate preferred embodiments of the present invention.

Figure 1:
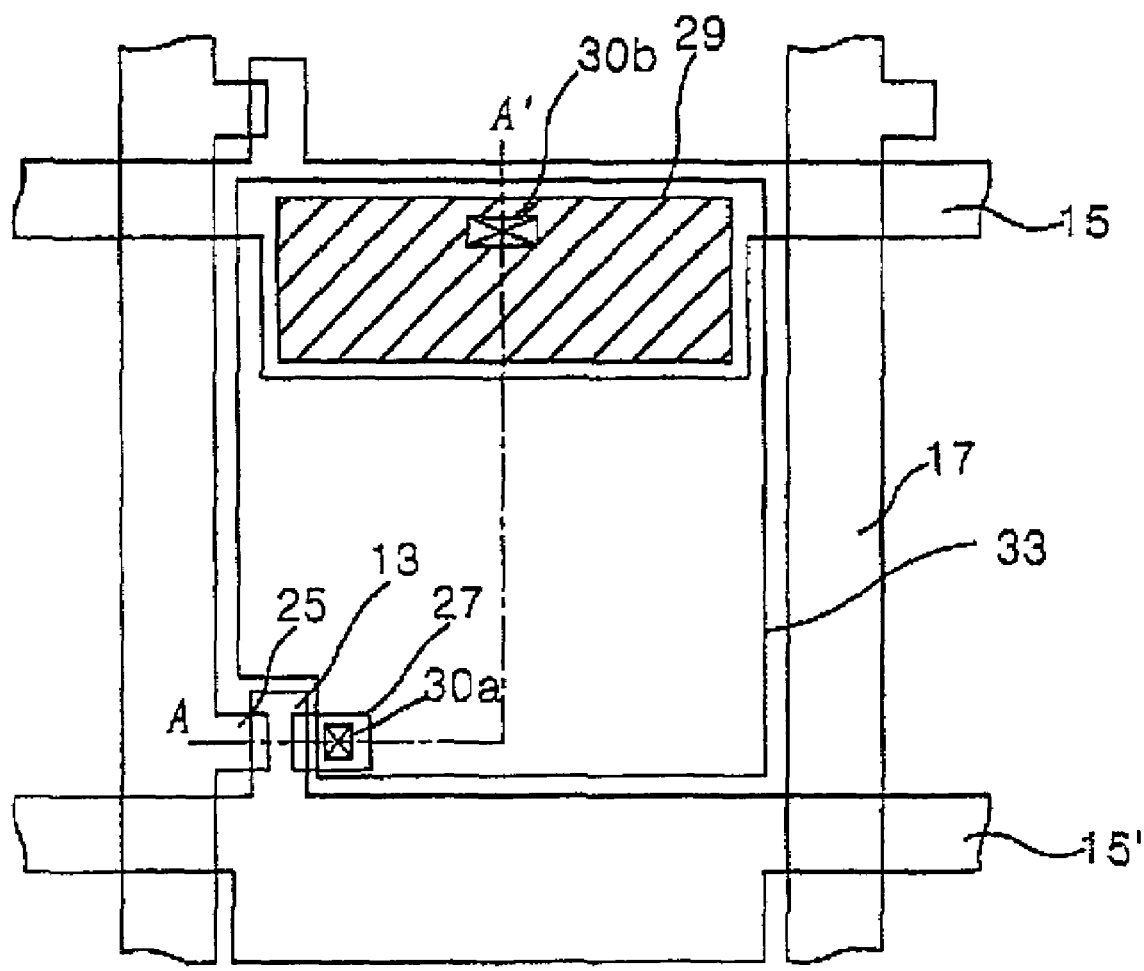
FIG. 1 is a plan view illustrating an array substrate of a conventional liquid crystal display having a storage on gate (SOG) system.
Figure 2:
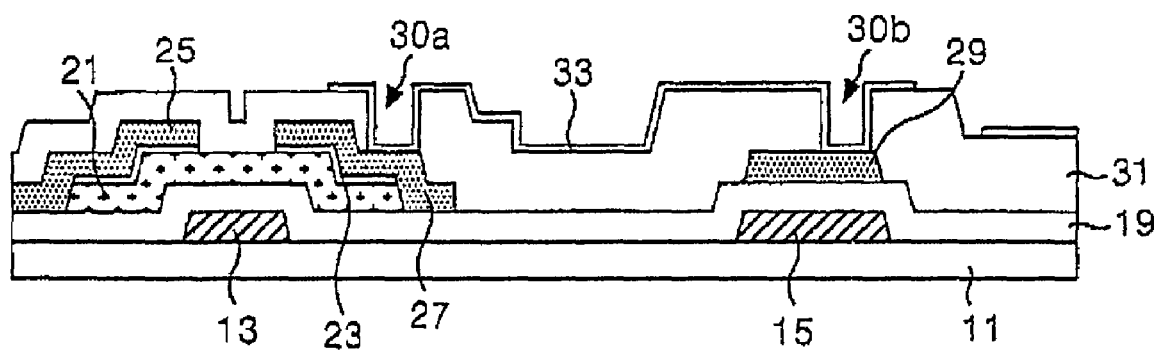
FIG. 2 is a sectional view of the array substrate, shown in FIG. 1, taken along the line A-A'.
Figure 3A:
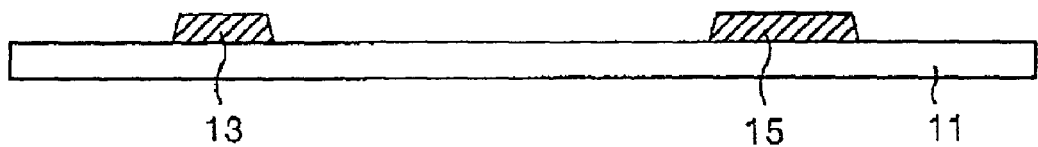
FIG. 3a to FIG. 3e are sectional views representing by steps a method of fabricating the array substrate shown in FIG. 2.
Figure 3B:
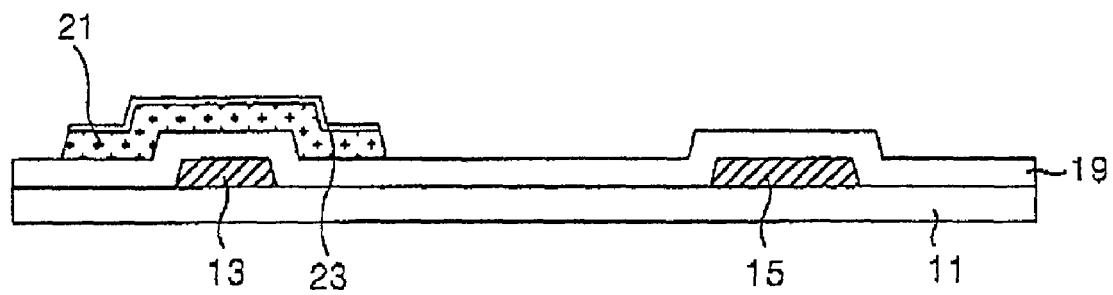
Figure 3C:
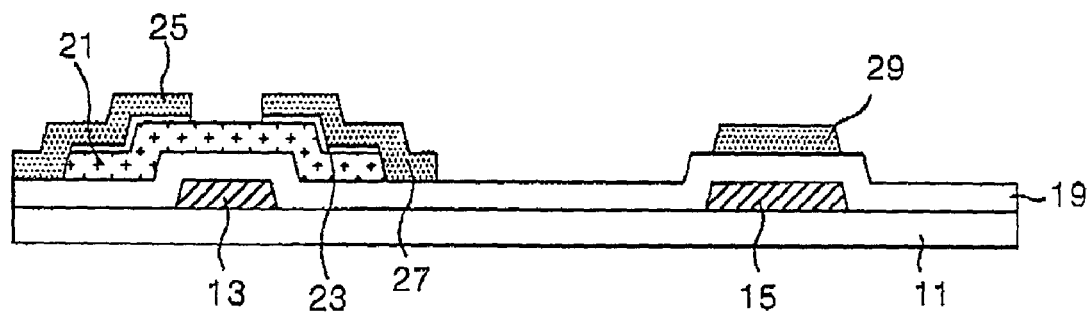
Figure 3D:
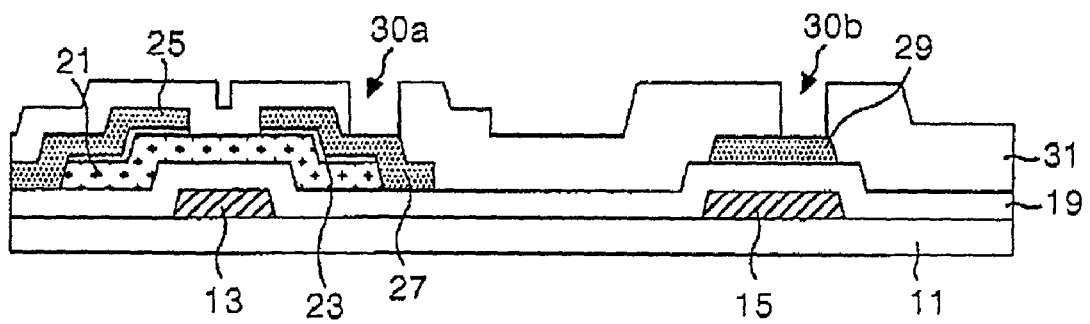
Figure 3E:
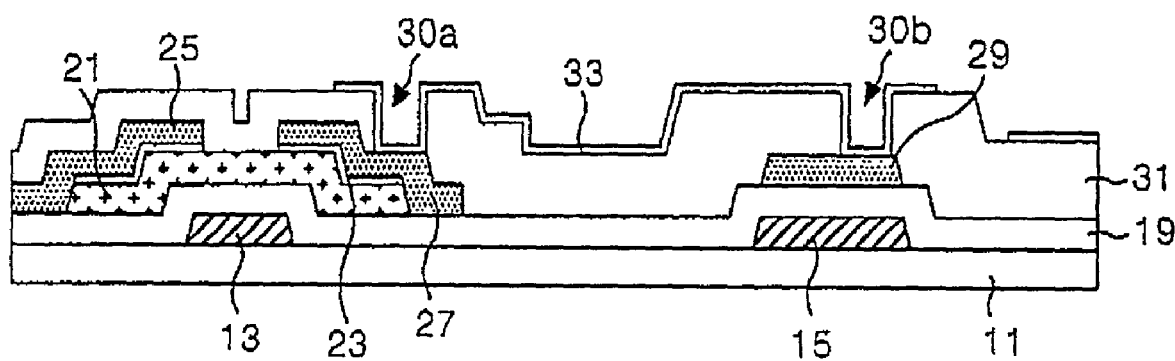
Figure 4:
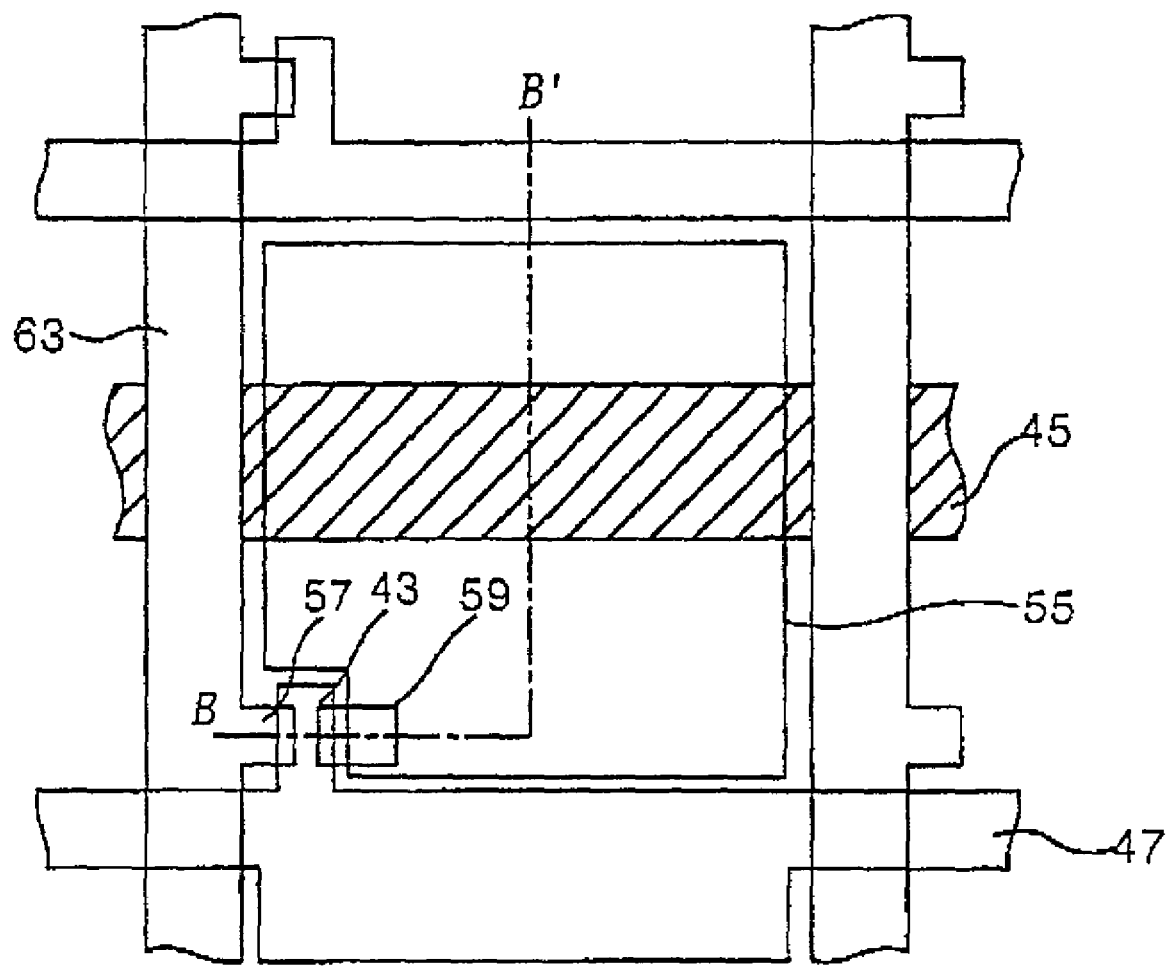
FIG. 4 is a plan view illustrating an array substrate of a conventional liquid crystal display having a storage on common (SOC) system.
Figure 5:
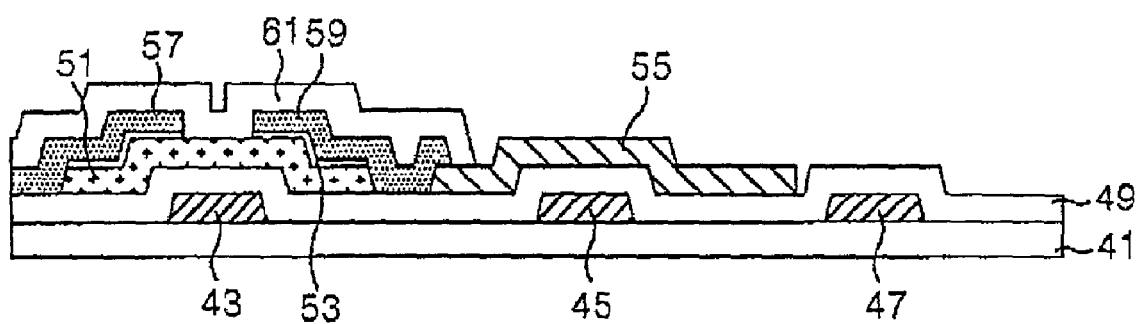
FIG. 5 is a sectional view of the array substrate, shown in FIG. 4, taken along the line B-B'.
Figure 6A:
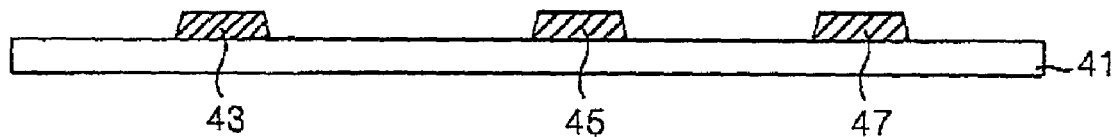
FIG. 6a to FIG. 6d are sectional views representing steps of a method of fabricating the array substrate shown in FIG. 5.
Figure 6B:
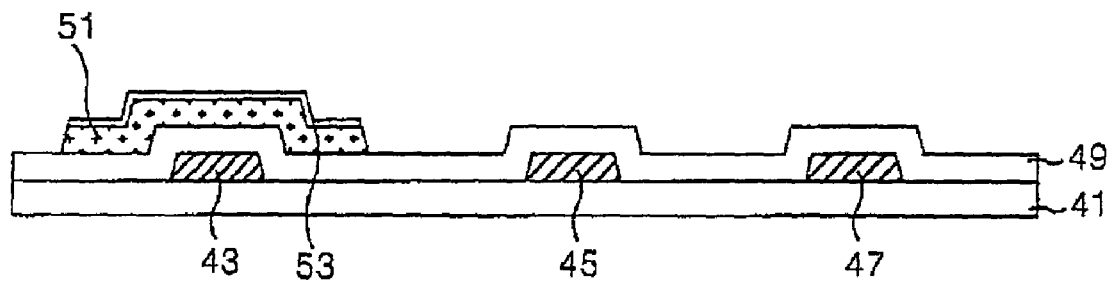
Figure 6C:
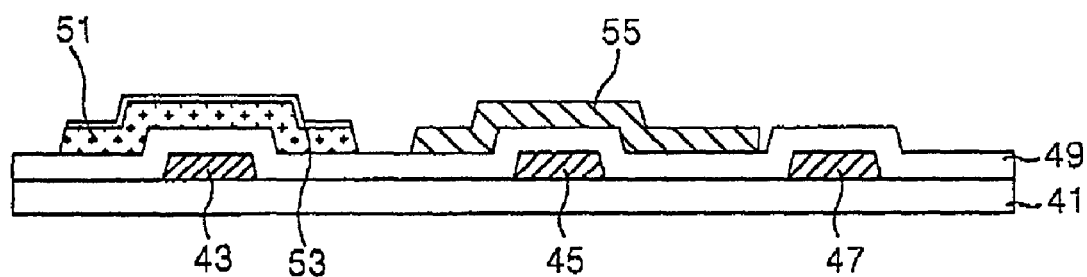
Figure 6D:
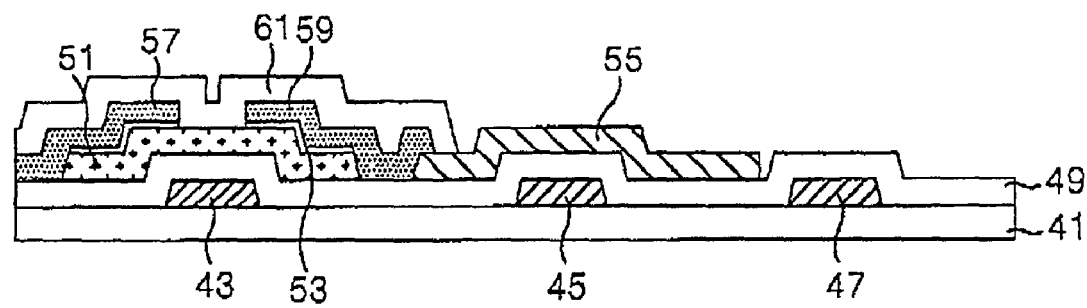
Figure 7:
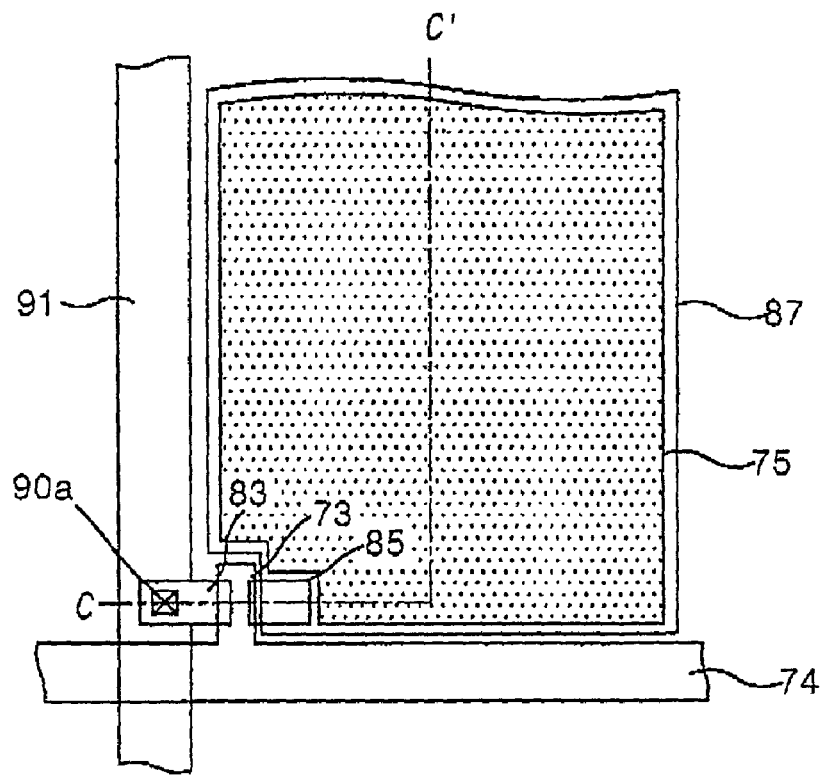
FIG. 7 is a plan view illustrating an array substrate of a liquid crystal display according to a first embodiment of the present invention.
Figure 8:
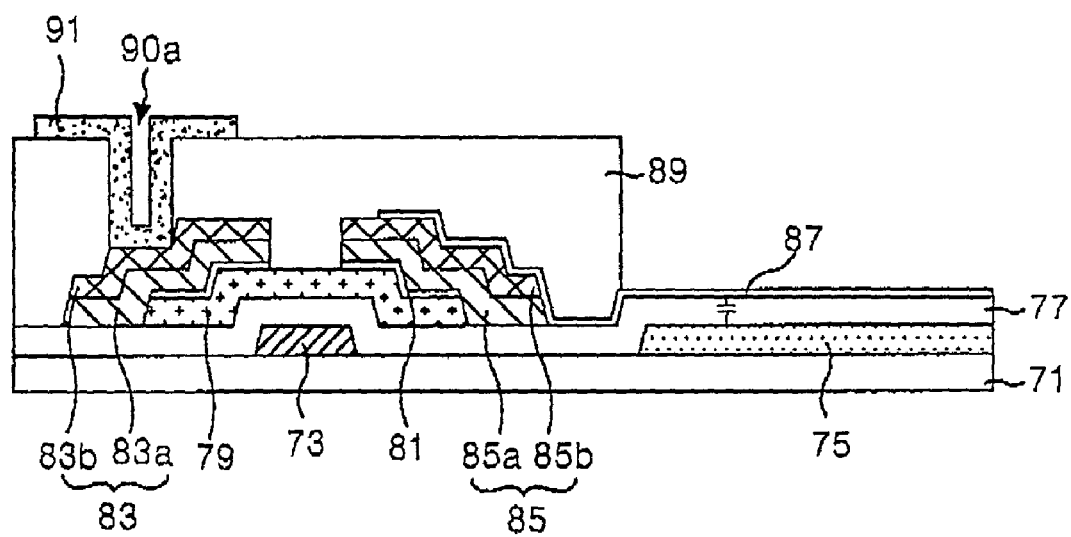
FIG. 8 is a sectional view of the array substrate, shown in FIG. 7, taken along the line C-C'.

FIG. 7 is a plan view illustrating an array substrate of a liquid crystal display according to a first embodiment of the present invention, and FIG. 8 is a sectional view of the array substrate, shown in FIG. 7, taken along the line.

Referring to FIG. 7 and FIG. 8, a lower substrate 71 includes a TFT positioned at an intersection of a gate line 74 and a data line 91. A pixel electrode 87 connects to a drain electrode 85 of the TFT and a storage capacitor positioned at a pixel cell area.

The TFT includes a gate electrode 73 connected to the gate line 74, a source electrode 83 connected with the data line 91 through a contact hole 90a, and a drain electrode 85. Further, the TFT includes a gate insulating film 77 for insulating the gate electrode 73 from the source and drain electrodes 83 and 85, and an active layer 79 and an ohmic contact layer 81 for forming a channel between the source electrode 83 and the drain electrode 85 by a gate voltage supplied to the gate electrode 73. Here, the source and the drain electrodes 83 and 85 have metal layers 83a and 85a and buffer metal layers 83b and 85b. The buffer metal layer 85b of the drain electrode 85 connects with the pixel electrode 87 without using a contact hole. The data line 91 electrically connects to the buffer metal layer 83b of the source electrode 83 through the contact hole 90a formed at a protective layer 89. The TFT responds to a gate signal from the gate line 74 and supplies a data signal from the data line 91 to the pixel electrode 87 through the source electrode 83 and the drain electrode 85 connected with the data line 91.

The pixel electrode 87 is positioned at the cell area divided by the data line 91 and the gate line 74. The pixel electrode 87 is made of a transparent conductive material having good light transmissivity, such as ITO. The pixel electrode 87 generates a potential difference from a common transparent electrode (not shown) by the data signal supplied via the TFT. The liquid crystal located between the lower substrate 71 and an upper substrate switches by the dielectric anisotropy interacting with the potential difference, whereby light incident from a light source is transmitted.

The storage capacitor is charged with a voltage during the period when a gate high voltage is applied to the gate line 74, and discharges the charged voltage during the period when the data signal is supplied to the pixel electrode 87, thereby preventing a voltage swing of the pixel electrode 87. The volume of the storage capacitor should be large enough to stabilize the pixel voltage. For this, the storage electrode 75 is formed at the lower part of the pixel electrode 87 provided at the cell area, thereby increasing the capacitance.

FIG. 9 to FIG. 14 are sectional views illustrating by steps a method of fabricating the array substrate shown in FIG. 8, according to a preferred embodiment of the invention.

Figure 9:
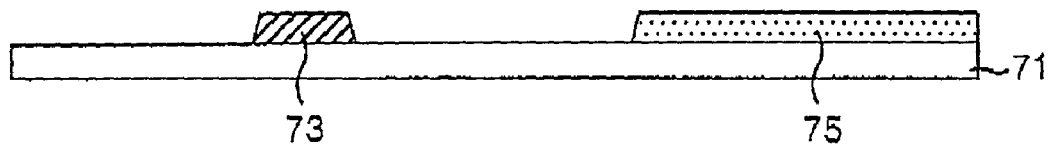
FIG. 9 to FIG. 14 are sectional views representing steps of a method of fabricating the array substrate shown in FIG. 8.

Referring to FIG. 9, the gate electrode and the storage electrode 75 which are projected from the gate line 74, are formed on the substrate 71.

The gate electrode 73 forms by depositing aluminum (Al) or copper (Cu) by, for example, a sputtering technique, followed by patterning. The aluminum or copper deposition is not restricted to sputtering, but any suitable deposition technique can be utilized.

The storage electrode 75 is formed by depositing a transparent conductive material that can be any one of ITO, IZO or ITZO, in the pixel area. A sputtering technique or any other suitable deposition method can be used. Then the storage electrode 75 is patterned.

Figure 10:
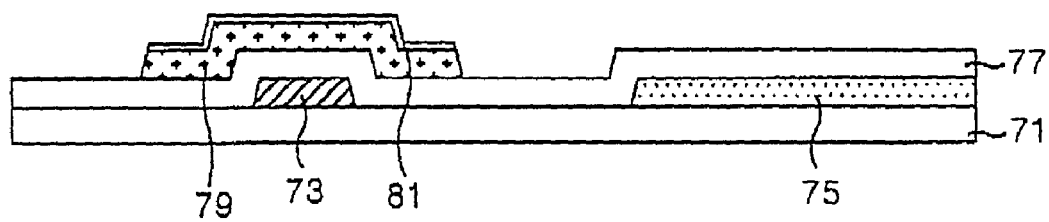

Referring to FIG. 10, the gate insulating film 77 is formed on the gate electrode 73 and the storage electrode 75. The active layer 79 and the ohmic contact layer 81 are formed on the gate insulating film 77.

The gate insulating film 77 is formed by covering the gate electrode 73 and the storage electrode 75. The gate insulating film 77 is formed of an insulating material such as silicon nitride $SiN_x$, silicon oxide $SiO_x$ or other suitable material by a plasma enhanced chemical vapor deposition (PECVD) technique.

The active layer 79 and the ohmic contact layer 81 are formed by depositing two semiconductor layers on the gate insulating film 77 and then patterning them. The active layer 79 is formed of undoped amorphous silicon, and the ohmic contact layer 81 is formed of amorphous silicon in which N-type or P-type impurities are doped in high concentration.

Figure 11:
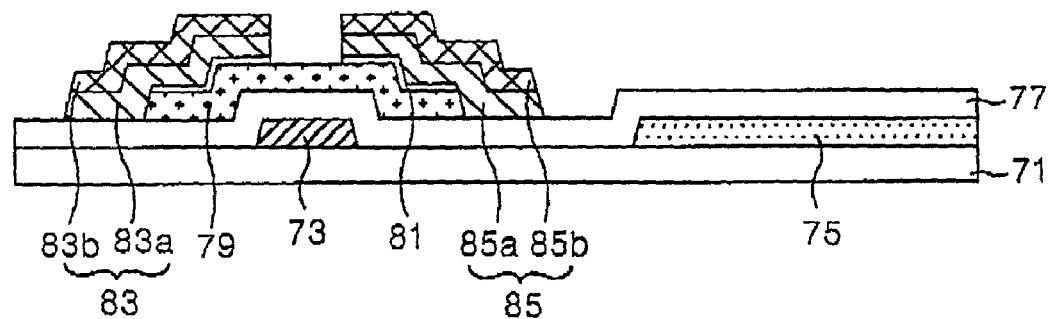

FIG. 11 shows the formation of the source and the drain electrodes.

The source and the drain electrodes 83 and 85 are composed of metal layers 83a and 85a and buffer metal layers 83b and 85b.

The metal layers 83a and 85a are formed by depositing aluminum (Al) or copper (Cu) over the gate insulating film 77 by a CVD technique or a sputtering technique.

The buffer metal layers 83b and 85b are formed by entirely depositing on the metal layers 83a and 85a. Here, molybdenum (Mo), titanium (Ti), tantalum (Ta) or any suitable metal that has good conductivity are used as the buffer metal layers 83b, 85b for reducing the contact resistance of the metal layers 83a, 85a. The source and the drain electrodes 83 and 85 are formed by patterning metal layers 83a and 85a and buffer metal layers 83b and 85b. Thereafter, the corresponding part of the ohmic contact layer 81 to the gate electrode 73 is patterned to expose the active layer 79. The corresponding part of the active layer 79 of the gate electrode 73 between the source and the drain electrodes 83 and 85 becomes a channel.

Figure 12:
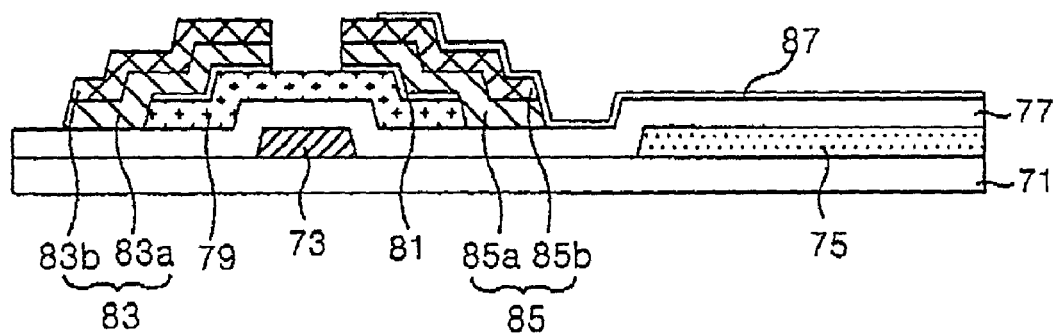

Subsequently, the pixel electrode 87 is formed on the gate insulating film 77, as is shown in FIG. 12.

The pixel electrode 87 is formed by depositing a transparent conductive material, e.g., one of ITO, IZO and ITZO, and then patterning it. The pixel electrode 87 is electrically in contact with the buffer metal layer 85b of the drain electrode 85.

Figure 13:
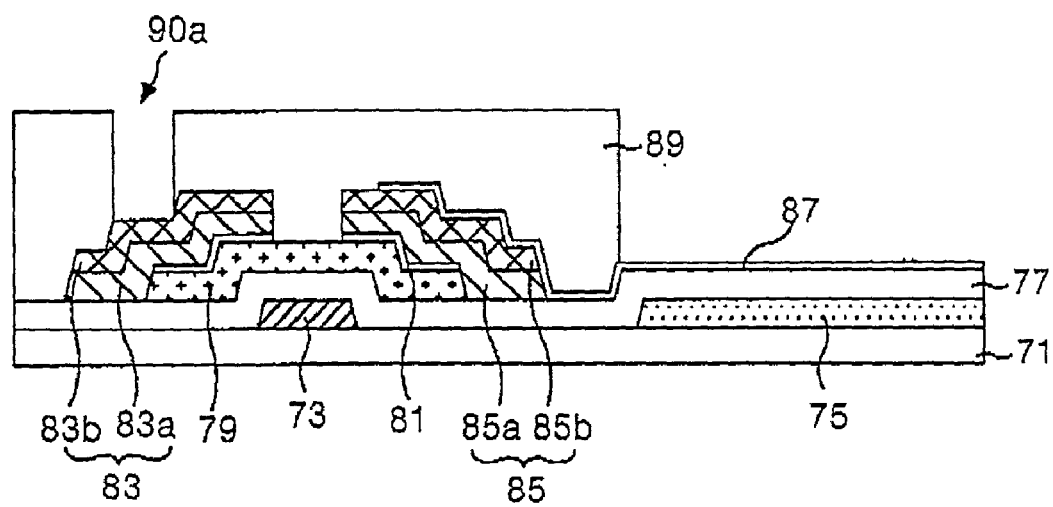

Referring to FIG. 13, the contact hole 90a is formed on the protective layer 89.

The protective layer 89 is formed by coating an insulating material by a spin coating technique to cover the source and drain electrodes 83 and 85. Accordingly, the surface of the protective layer 89 is flattened. In the protective layer 89 is formed the contact hole 90a which is patterned and in which the buffer metal layer 83b of the source electrode 83 is exposed.

The protective layer 89 is formed of an organic insulating material, having a small dielectric constant, such as an acrylic organic compound, TEFLON (polytetrafluoroethylene), benzocyclobutene (BCB), CYTOP (perfluoropolymer resin), perfluorocyclobutane (PFCB), etc.

Figure 14:
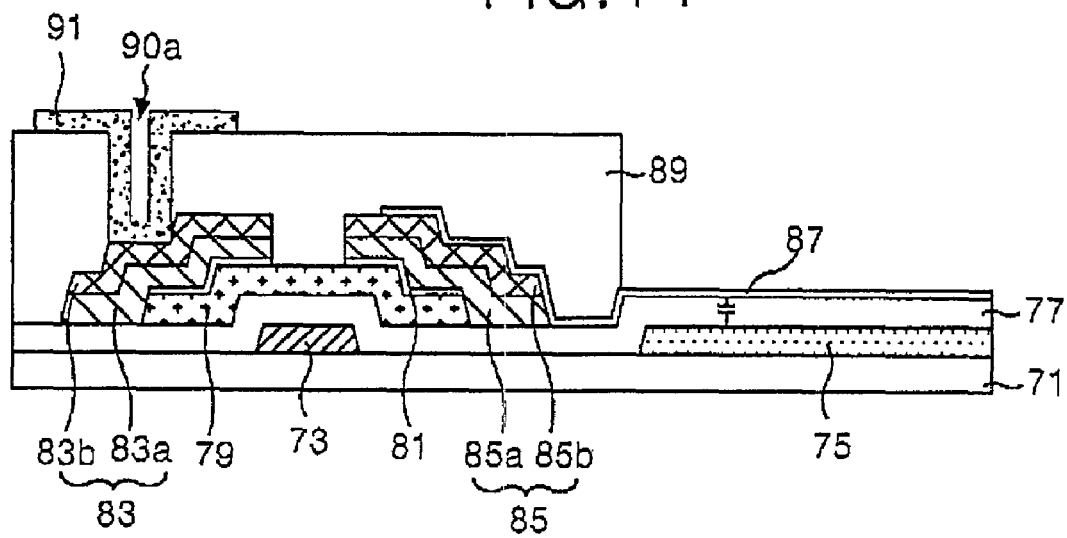

Referring to FIG. 14, the data line 91 is formed on the protective layer 89.

The data line 91 is formed by depositing aluminum (Al), copper (Cu) or any other suitable material by, for example, a sputtering technique, followed by patterning. The data line 91 is electrically connected with the buffer metal layer 83b of the source electrode 83 through the contact hole 90a.

Figure 15:
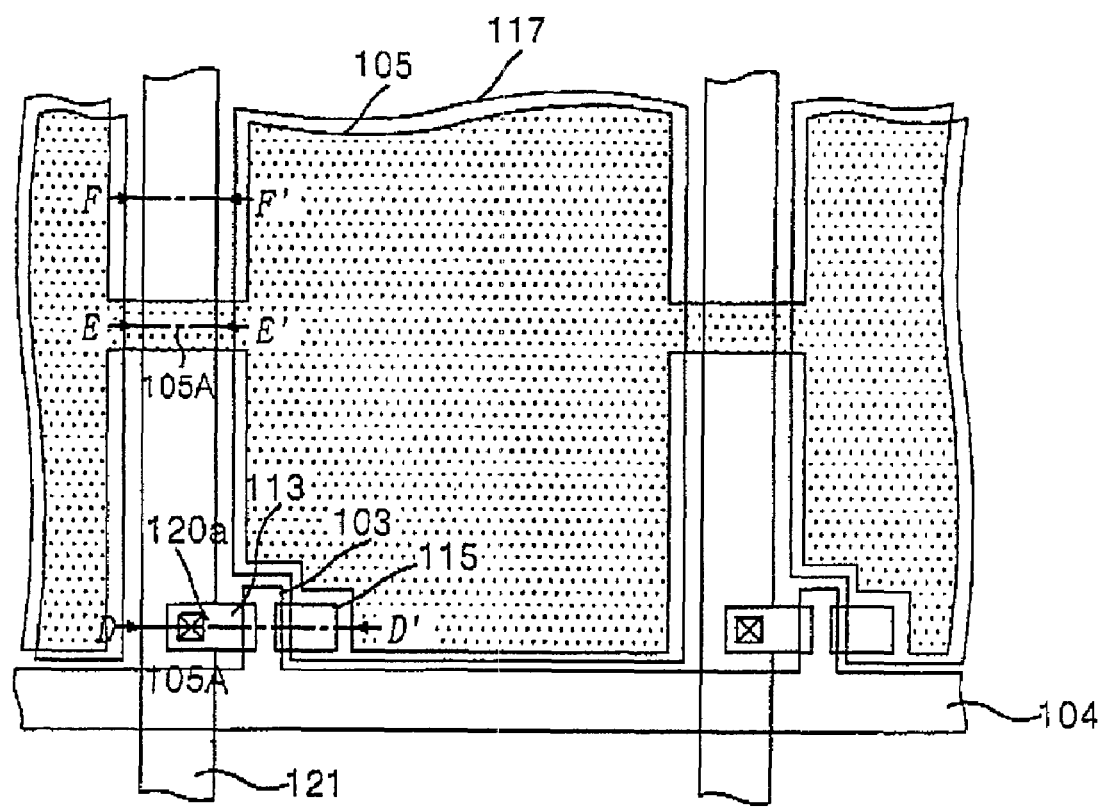
FIG. 15 is a plan view illustrating an array substrate of a liquid crystal display according to a second embodiment of the present invention.
Figure 16:
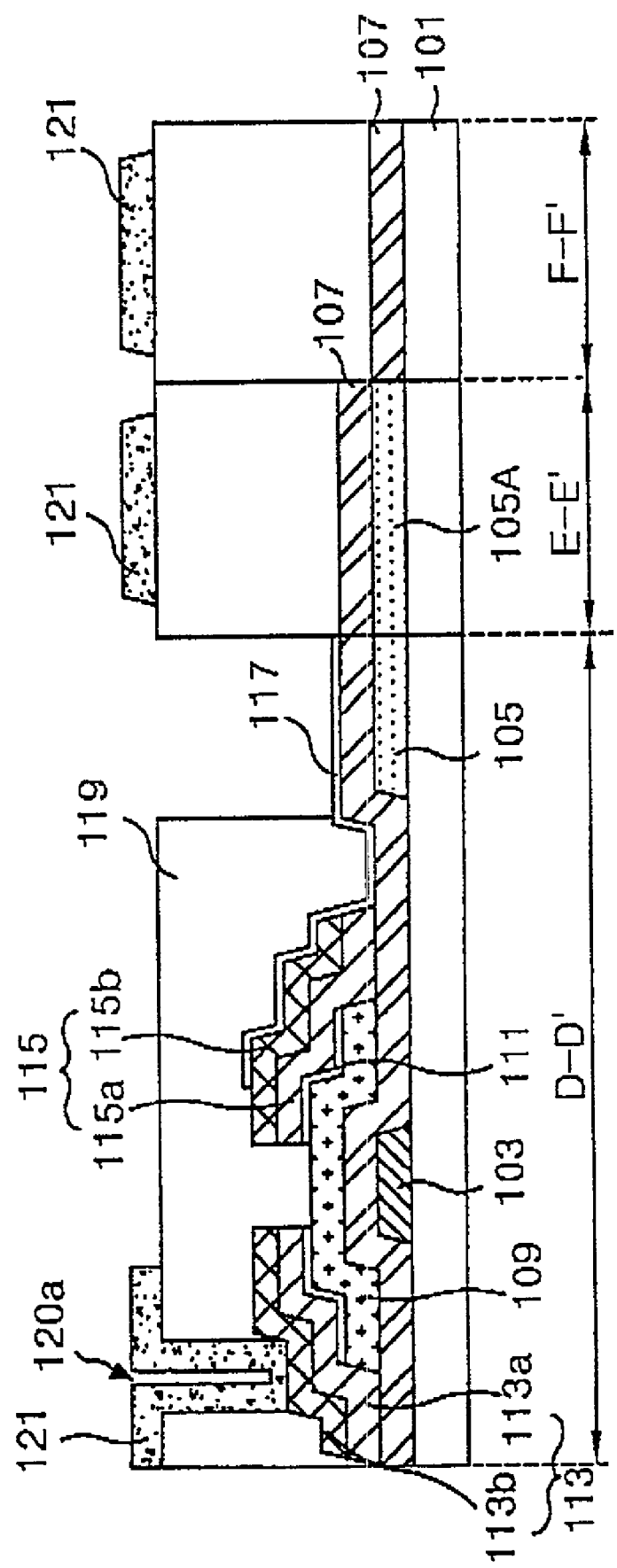
FIG. 16 is a sectional view of the array substrate, shown in FIG. 15, taken along the lines D-D', E-E', F-F'.

FIG. 15 is a plan view illustrating an array substrate of a liquid crystal display according to a second preferred embodiment of the present invention, FIG. 16 is a sectional view of the array substrate, shown in FIG. 15, taken along the lines taken along the line D-D', E-E', F-F'.

Referring to FIG. 15 and FIG. 16, a lower substrate 101 includes a TFT located at the intersection of a gate line 104 and a data line 121 and a pixel electrode 117. The TFT connects to a drain electrode 115 and a storage capacitor located at a pixel cell area.

The TFT includes a gate electrode 103 connected to the gate line 104, a source electrode 113 connected with the data line 121 through a contact hole 120a, and a drain electrode 115. The TFT includes a gate insulating film 107 for insulating the gate electrode 103 from the source and drain electrodes 113 and 115, an active layer 109 and an ohmic contact layer 111 for forming a channel between the source electrode 113 and the drain electrode 115 by a gate voltage supplied to the gate electrode 103. Here, the source and the drain electrodes 113 and 115 are composed of metal layers 113a and 115a and buffer metal layers 113b and 115b. The data line 121 is electrically connected with the buffer metal layer 113b of the source electrode 113 through a contact hole 120a formed at a protective layer 119. The TFT responds to a gate signal from the gate line 104 and electively supplies a data signal from the data line 121 to the pixel electrode 117.

The pixel electrode 117 is positioned at the cell area divided by the data line 121 and the gate line 104. The pixel electrode 117 is made of a transparent conductive material having good light transmissivity, such as ITO. The pixel electrode 117 is electrically connected with the buffer metal layer 115b of the drain electrode 115. The pixel electrode 117 generates a potential difference from a common transparent electrode by the data signal supplied via the TFT. The liquid crystal located between the lower substrate 101 and an upper substrate switches according to its dielectric anisotropy reacting to the potential difference. Light is transmitted according to the degree of the rotation of the liquid crystal.

The storage capacitor is charged with a voltage during the period when a gate high voltage is applied to the gate line 104, and discharges the charged voltage during the period when the data signal is supplied to the pixel electrode 117, thereby preventing a voltage swing of the pixel electrode 117. The storage capacity of the storage capacitor should be large enough to stabilize the pixel voltage. For this, the storage capacitor provides the storage electrode 105 at each corresponding pixel cell area corresponding to the pixel electrode 117. An auxiliary storage electrode 105A connects the storage electrode 105 formed at each pixel cell.

FIG. 17 to FIG. 22 are sectional views illustrating by steps a method of fabricating the array substrate shown in FIG. 16.

Figure 17:
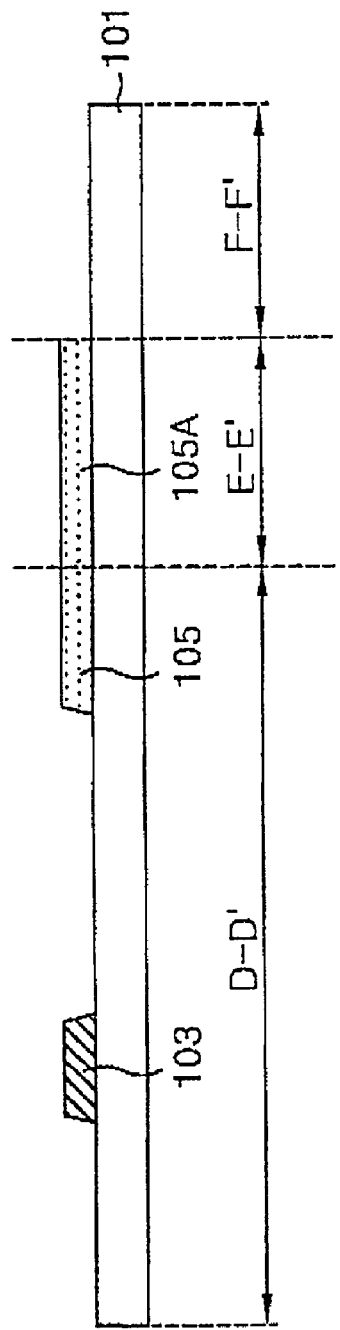
FIG. 17 to FIG. 22 are sectional views representing by steps a method of fabricating the array substrate shown in FIG. 16.

Referring to FIG. 17, the storage electrode 105 including the auxiliary storage electrode 105A and the gate electrode 103 connected with the gate line 104, are formed on the substrate 101.

The gate electrode 103 is formed by entirely depositing aluminum (Al), copper (Cu) or other suitable material by, for example, a sputtering technique, followed by patterning.

The storage electrode 105 is formed by depositing a transparent conductive material and then patterning it. The storage electrode 105 is formed of any one of ITO, IZO or ITZO.

The auxiliary storage electrode 105A is electrically connected by coupling the storage electrode 105 formed at each pixel cell.

Figure 18:
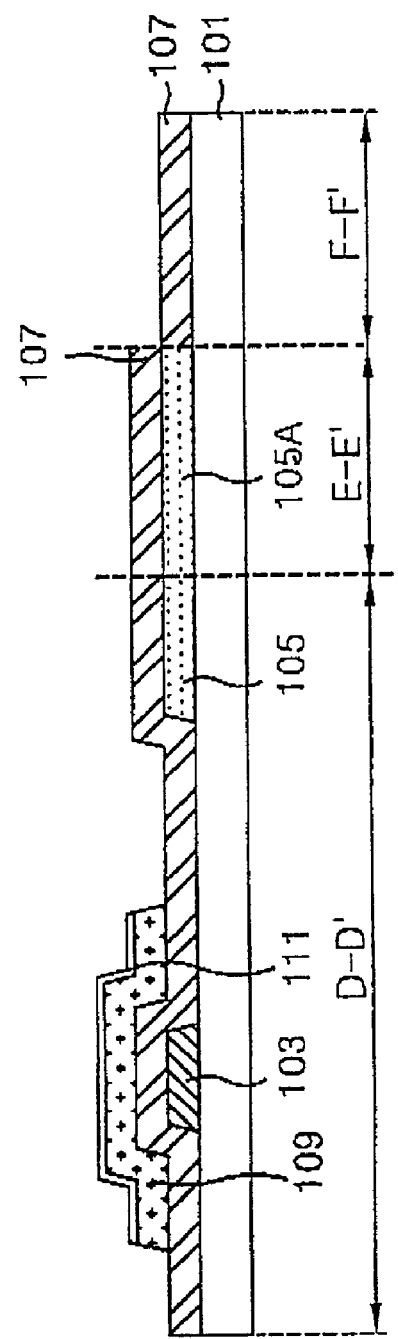

Referring to FIG. 18, the active layer 109 and the ohmic contact layer 111 are formed on the gate insulating film 107.

The gate insulating film 107 is formed by entirely depositing on the substrate 101 an insulating material that can be, but is not restricted to, silicon nitride ($SiN_x$) or silicon oxide ($SiO_x$) by a plasma enhanced chemical vapor deposition (PECVD) technique so as to cover the gate electrode 103 and the storage electrode 105. The active layer 109 and the ohmic contact layer 111 are formed by depositing two semiconductor layers over the gate insulating film 107 and then patterning them. Here, the active layer 109 is formed of undoped amorphous silicon. The ohmic contact layer 111 is formed of amorphous silicon in which N-type or P-type impurities are doped at high concentration.

Figure 19:
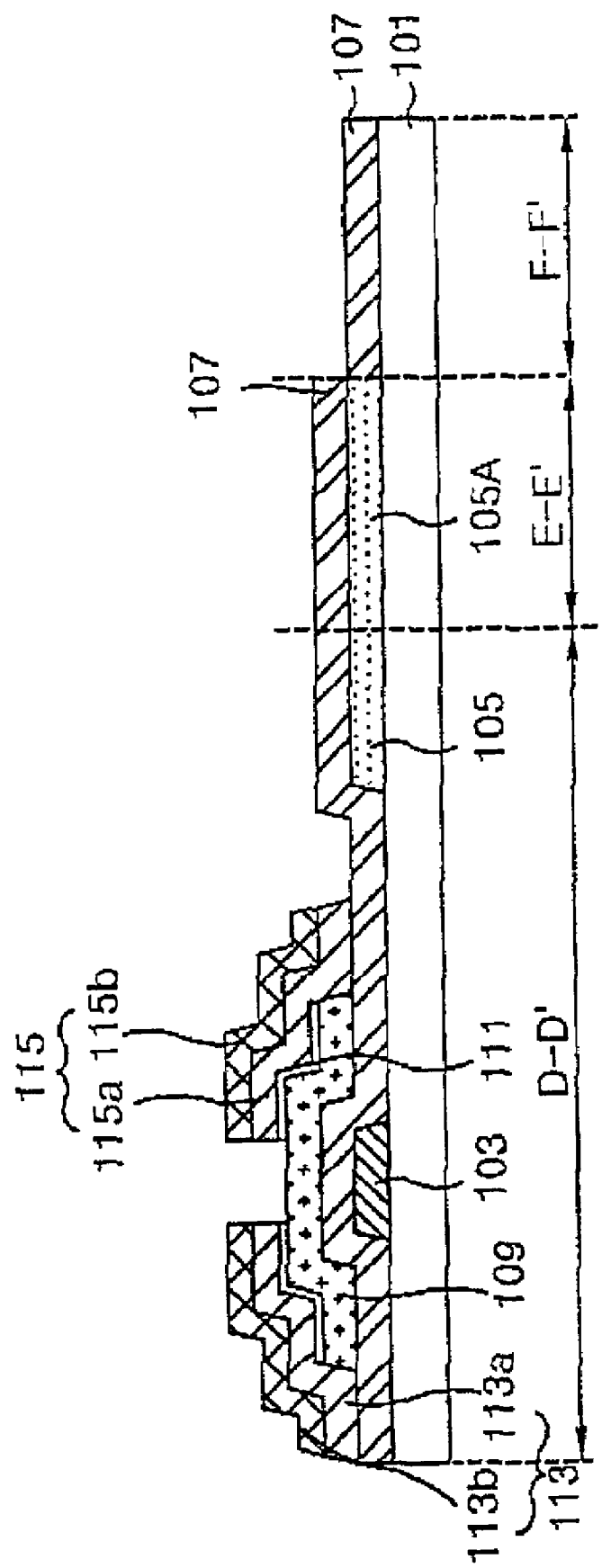

Referring to FIG. 19, the source and the drain electrodes 113 and 115 are formed. The source and the drain electrodes 113 and 115 are composed of metal layers 113a and 115a and buffer metal layers 113b and 115b.

The metal layers 113a and 115a are formed by depositing aluminum (Al) or copper (Cu) entirely over the gate insulating film 107 by a CVD technique or a sputtering technique. The buffer metal layers 113b and 115b are formed by entirely depositing on the metal layers 113a and 115a a highly conductive material such as molybdenum (Mo), titanium (Ti) or tantalum (Ta). Here, the buffer metal layers 113b and 115b are formed to reduce the contact resistance of the metal layers 113a and 115a. The source and the drain electrodes 113 and 115 are formed by patterning the metal layers 113a, 115a and buffer metal layers 113b, 115b. Afterwards, the part of the ohmic contact layer 111 corresponding to the gate electrode 103 is patterned to expose the active layer 109. The part of the active layer 109 corresponding to the gate electrode 103 between the source and the drain electrodes 113 and 115 become a channel.

Figure 20:
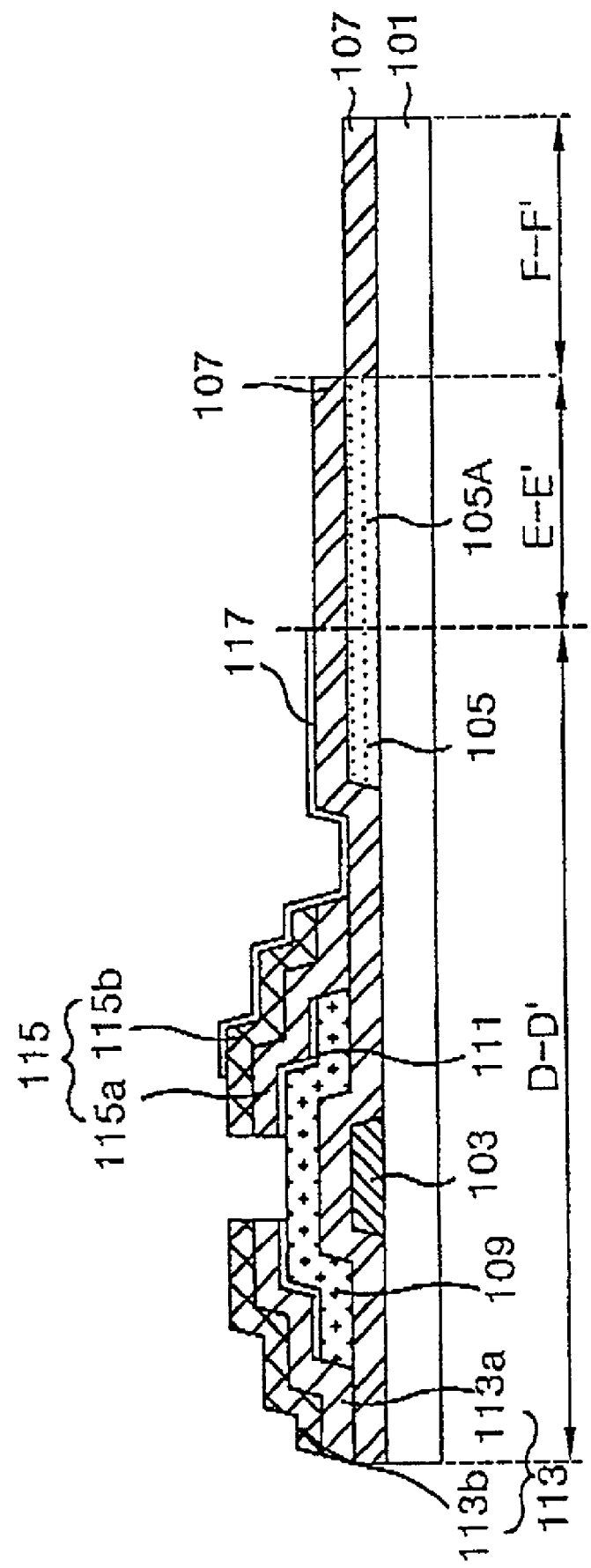

Subsequently, the pixel electrode 117 is formed, as is shown in FIG. 20.

The pixel electrode 117 is formed by depositing a transparent conductive material on the gate insulating film 107 and then patterning it. The pixel electrode 117 is electrically in contact with the buffer metal layer 115b of the drain electrode 115. The pixel electrode 117 corresponds to the storage electrode 105 and is formed of any one of ITO, IZO or ITZO.

Figure 21:
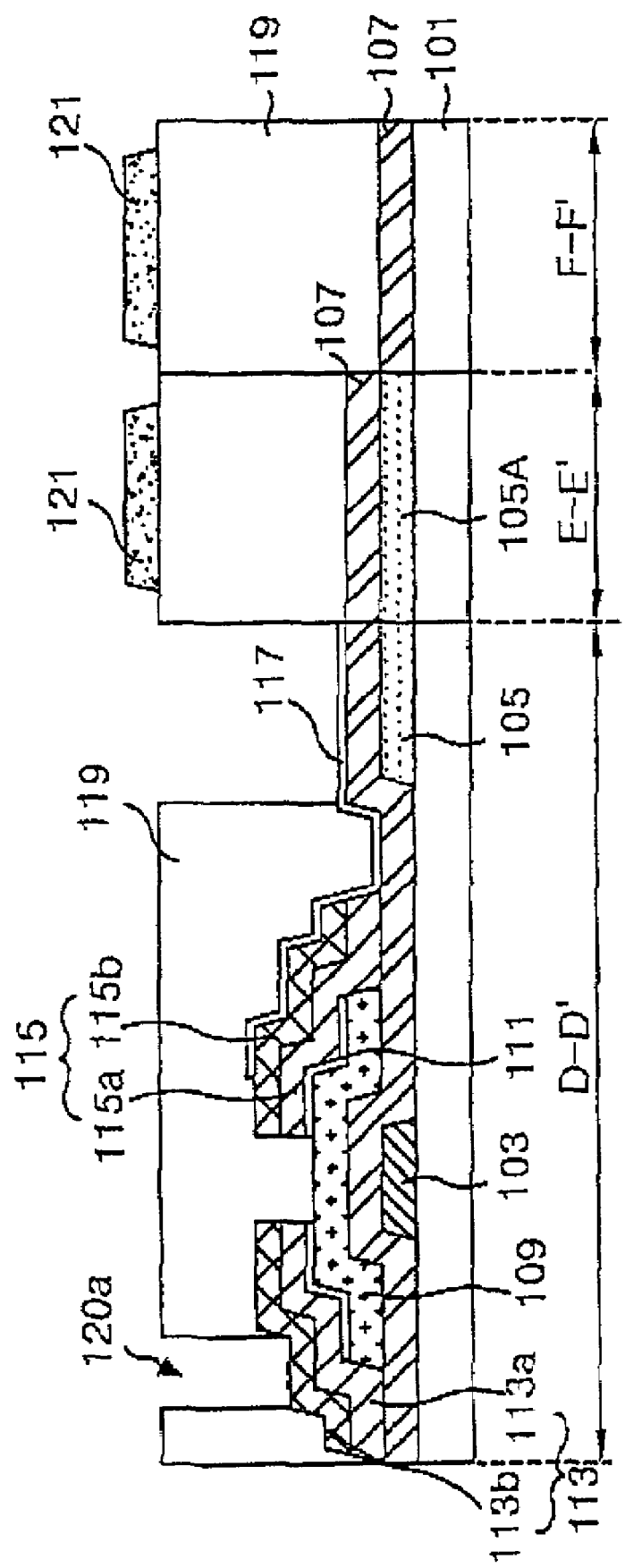

Referring to FIG. 21, a contact hole 120a is formed on the protective layer 119.

The protective layer 119 is formed by coating an insulating material by a spin coating technique to cover the source and drain electrodes 113 and 115. By patterning, the protective layer forms the contact hole 120a which exposes the buffer metal layer 113b of the source electrode 113.

The protective layer 109 is formed of an organic insulating material, having a small dielectric constant, such as acrylic organic compound, i.e., acrylics, TEFLON (polytetrafluoroethylene), benzocyclobutene (BCB), CYTOP (perfluoropolymer resin), perfluorocyclobutane (PFCB).

Figure 22:
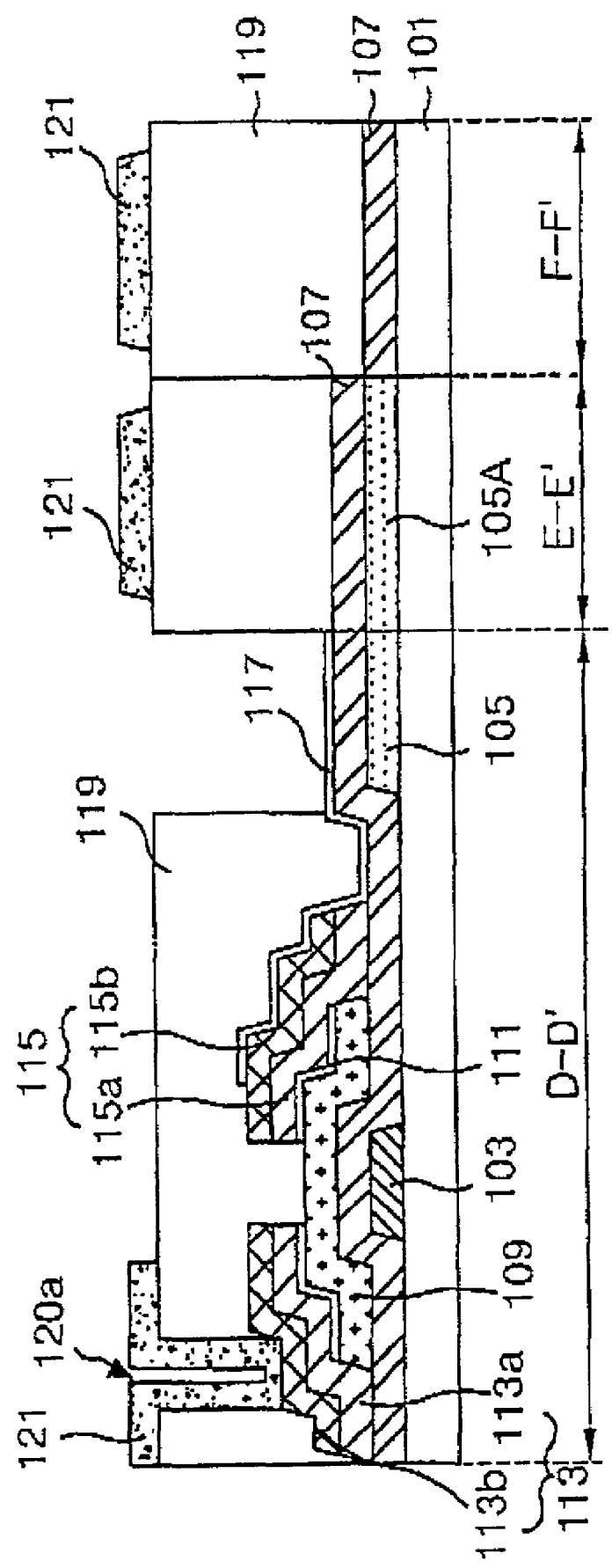

Referring to FIG. 22, the data line 121 is formed on the protective layer 119.

The data line 121 is formed by depositing aluminum (Al), copper (Cu) or other suitable material by a sputtering or other appropriate technique, followed by patterning. The data line 121 electrically connects with the buffer metal layer 113b of the source electrode 113 through the contact hole 120a.

Thus, in the liquid crystal display and the fabricating method thereof according to the present invention, the storage electrode of a transparent conductive material is formed at each pixel cell area. Also, the pixel electrode electrically connected with the buffer metal layer is formed by providing the buffer metal layer on the source and the drain electrodes. In this invention, the area of the storage capacitor is increased by the storage electrode and the pixel electrode. Accordingly, the aperture ratio increases and the capacitance of the capacitor increases.

As described above, the liquid crystal display and the fabricating method thereof according to the present invention increases the aperture ratio of the storage capacitor and is capable of increasing the capacitance of the storage capacitor. As a result, in the present invention, the picture quality becomes uniform and stable owing to the high accuracy thereof.

It should be understood to a person having ordinary skill in the art that the invention is not limited to the embodiments, but rather that various changes or modifications thereof are possible without departing from the scope and spirit of the invention. Accordingly, the scope of the invention shall be determined only by the appended claims and their equivalents.

What is claimed is:

1. A liquid crystal display, comprising:
    a gate electrode over a substrate;
    a gate insulating film entirely deposited over the substrate to cover said gate electrode;
    an active layer formed on said gate insulating film which overlaps with said gate electrode;
    an ohmic contact layer formed on said active layer;
    a source electrode formed on said ohmic contact layer;
    a drain electrode formed on said ohmic contact layer, the drain electrode being opposed to said source electrode to form a channel;
    a buffer layer formed over said source and drain electrodes;
    a storage electrode formed of a transparent conductive material located in a same layer as said gate electrode and a gate line;
    an auxiliary storage electrode connected to said storage electrode;
    a pixel electrode formed to oppose to said storage electrode having said gate insulating film in between said pixel electrode and said storage electrode, and said pixel electrode being electrically connected with said drain electrode without using a contact hole; and
    a protective layer covering said source electrode, said drain electrode and some portions of the pixel electrode, wherein a storage capacitor formed by the pixel electrode and the storage electrode that is located in the same layer as the gate electrode and the gate line are substantially the same size to stabilize a pixel voltage.

2. The liquid crystal display according to claim 1, wherein a contact hole connects said source electrode with a data line on the protective layer.

3. The liquid crystal display according to claim 2, wherein said buffer metal layer is formed from at least one material selected from the group consisting of molybdenum, titanium and tantalum.

4. The liquid crystal display according to claim 1, further comprising a data line crossed with said gate line and connected to said source electrode by piercing said protective layer.

5. The liquid crystal display according to claim 1, further comprising the gate line in the same layer as said gate electrode and said storage electrode.

6. The liquid crystal display according to claim 1, wherein said buffer metal layer reduces contact resistance.

7. The liquid crystal display according to claim 1, wherein said transparent conductive material comprises indium tin oxide.

8. The liquid crystal display according to claim 1, wherein said protective layer comprises an organic insulating material.

9. The liquid crystal display according to claim 1, wherein the pixel electrode is electrically in contact with the buffer metal layer over the drain electrode.

10. The liquid crystal display according to claim 1, wherein the pixel electrode is formed from ITO, IZO or ITZO.

11. The liquid crystal display according to claim 1, wherein the buffer layer entirely covers each of the source electrode and the drain electrode.

12. A method of fabricating a liquid crystal display, comprising:
   forming a gate electrode and a gate line over a substrate and at the same time forming a storage electrode in a same layer where said gate electrode and said gate line are formed, said storage electrode being formed of a transparent conductive material located in a same layer as said gate electrode and said gate line;
   forming an auxiliary storage electrode connecting to said storage electrode;
   forming a gate insulating film to cover said gate electrode, said gate line and said storage electrode;
   forming an active layer over said gate insulating film to overlap with said gate electrode;
   forming an ohmic contact layer over said active layer;
   forming a source electrode and a drain electrode by patterning to expose said active layer;
   forming a buffer metal layer over said source electrode and said drain electrode;
   forming a pixel electrode opposed to said storage electrode having said gate insulating film in between said pixel electrode and said storage electrode, and said pixel electrode being contacted with said drain electrode without using a contact hole;
   forming a protective layer over said source electrode and said drain electrode;
   forming a contact hole that pierces said protective layer; and
   forming a data line crossed with said gate line and connected with said source electrode through said contact hole, wherein a storage capacitor formed by the pixel electrode and the storage electrode that is located in the same layer as the gate electrode and the gate line are substantially the same size to stabilize a pixel voltage.

13. The method according to claim 12, wherein the buffer metal layer reduces contact resistance.

14. The method of according to claim 12, wherein said buffer metal layer is formed from at least one material selected from the group consisting of molybdenum, titanium and tantalum.

15. The method of according to claim 12, wherein the transparent conductive material comprises indium tin oxide.

16. The method of according to claim 12, wherein said protective layer comprises an organic insulating material.

17. The method of according to claim 16, wherein said organic insulating material is at least one material selected from the group consisting of acrylics, polytetrafluoroethylene, benzocyclobutene, perfluoropolymer resin and perfluorocyclobutane.

18. The method according to claim 12, wherein the pixel electrode is electrically in contact with the buffer metal layer over the drain electrode.

19. The method according to claim 12, wherein the pixel electrode is formed from ITO, IZO or ITZO.

20. The method according to claim 12, wherein the buffer layer entirely covers each of the source electrode and the drain electrode.

21. A liquid crystal display, comprising:
   a gate electrode over a substrate;
   a gate insulating film entirely deposited over the substrate to cover said gate electrode;
   an active layer formed on said gate insulating film which overlaps with said gate electrode;
   an ohmic contact layer formed over said active layer;
   a source electrode formed over said ohmic contact layer;
   a drain electrode formed over said ohmic contact layer, the drain electrode being opposed to said source electrode to form a channel;
   a buffer metal layer over said source and drain electrode;
   a protective layer covering said source and said drain electrodes;
   a storage electrode formed of a transparent conductive material located in a same layer as said gate electrode and a gate line; and
   a pixel electrode formed to oppose to said storage electrode having said gate insulating film in between said pixel electrode and said storage electrode, and said pixel electrode being electrically connected with said drain electrode without using a contact hole, wherein a storage capacitor formed by the pixel electrode and the storage electrode that is located in the same layer as the gate electrode and a gate line are substantially the same size to stabilize a pixel voltage.

22. The liquid crystal display according to claim 21, wherein the pixel electrode is electrically in contact with the buffer metal layer over the drain electrode.

23. The liquid crystal display according to claim 21, wherein the pixel electrode is formed from ITO, IZO or ITZO.

24. The liquid crystal display according to claim 21, wherein the buffer layer entirely covers each of the source electrode and the drain electrode.

* * * * *